(Model.)

L. G. HAEUSSERMANN.
APPARATUS FOR RESWEATING TOBACCO.

No. 262,948. Patented Aug. 22, 1882.

Attest:
F. B. Pastorius
M. B. Hahn

Inventor:
Liebhardt G. Haeussermann
by Francis D. Pastorius
Solicitor

UNITED STATES PATENT OFFICE.

LIEBHARDT G. HAEUSSERMANN, OF PHILADELPHIA, PENNSYLVANIA.

APPARATUS FOR RESWEATING TOBACCO.

SPECIFICATION forming part of Letters Patent No. 262,948, dated August 22, 1882.

Application filed April 27, 1882. (Model.)

*To all whom it may concern:*

Be it known that I, LIEBHARDT G. HAEUSSERMANN, a citizen of the United States, residing at Philadelphia, in the county of Philadelphia and State of Pennsylvania, have invented a new and useful Tobacco-Resweating Apparatus, of which the following is a specification.

My invention is for resweating tobacco by means of heat from boiling water and steam generated in the box or boiler, illustrated in the accompanying drawings, in which—

Figure 1:
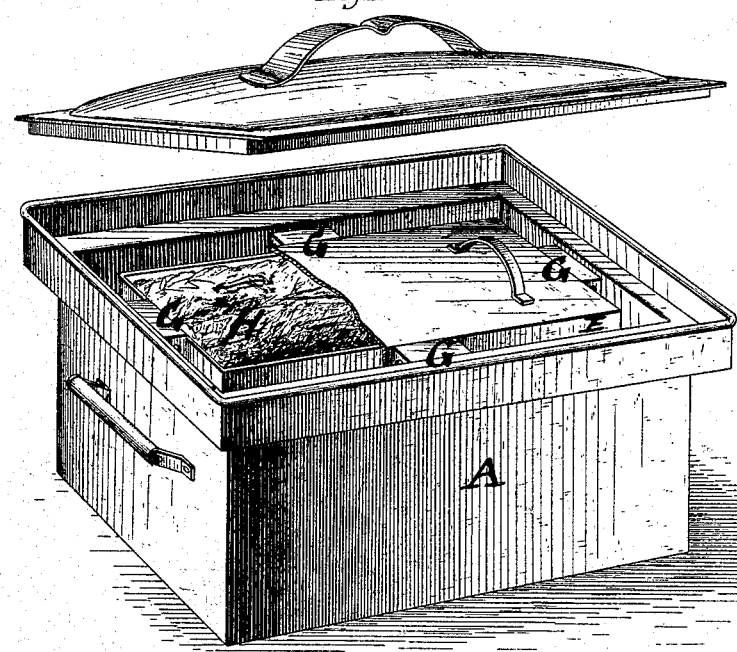
Figure 2:
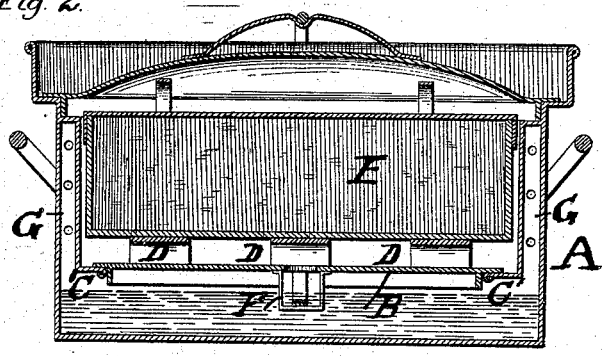
Figure 3:
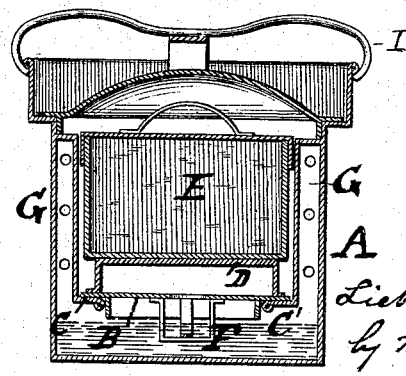

Figure 1 is a perspective view. Fig. 2 is a longitudinal vertical section, and Fig. 3 is a transverse vertical section.

A is a kettle or box, having a false bottom, B, on a ledge, C. The false bottom is provided with supports D for carrying a resweating-box, E, and has an opening, F, for the passage of water and steam.

G are perforated tubes at the sides of the kettle for conducting water and steam from beneath the false bottom B.

H is the lid of the kettle, which, when in use, is secured by a brace, I.

After the kettle A has been supplied with water to a suitable depth, preferably to the bottom of the resweating-box, which has been supplied with tobacco, H, and both its lid and that of the kettle fixed in place, heat is applied by placing the kettle on a stove or by any other convenient way. The steam and hot water form currents through the tubes G by surrounding the box. The light leaves are resweated into brown and dark colors and the quality of the tobacco otherwise improved.

I claim—

The combination of the kettle A with false bottom B, ledge C, box E, and tubes G, substantially for the purpose shown and described.

In testimony whereof I hereunto sign my name in presence of two subscribing witnesses.

LIEBHARDT G. HAEUSSERMANN.

Witnesses:
 CHAS. F. VAN HORN,
 FRANCIS D. PASTORIUS.